United States Patent
Biers, Sr.

(10) Patent No.: US 10,123,477 B2
(45) Date of Patent: Nov. 13, 2018

(54) STRING TRIMMER LINE HOLDER DEVICE AND SYSTEM

(71) Applicant: John E. Biers, Sr., Feura Bush, NY (US)

(72) Inventor: John E. Biers, Sr., Feura Bush, NY (US)

( * ) Notice: Subject to any disclaimer, the term of this patent is extended or adjusted under 35 U.S.C. 154(b) by 23 days.

(21) Appl. No.: 14/636,298

(22) Filed: Mar. 3, 2015

(65) Prior Publication Data
US 2015/0327435 A1    Nov. 19, 2015

Related U.S. Application Data

(60) Provisional application No. 61/992,439, filed on May 13, 2014.

(51) Int. Cl.
*A01D 34/416* (2006.01)
*A01D 34/00* (2006.01)

(52) U.S. Cl.
CPC ....... *A01D 34/4166* (2013.01); *A01D 34/001* (2013.01)

(58) Field of Classification Search
CPC .............. A01D 34/4166; A01D 34/001; A01D 34/416; A01D 34/4161; A01D 34/4162; A01D 34/4163; A01D 34/4165; A01D 34/4168; A01D 34/43; A01D 34/46; A01D 34/62
USPC .................................. 206/388, 409; 30/276
See application file for complete search history.

(56) References Cited

U.S. PATENT DOCUMENTS

| | | | | | |
|---|---|---|---|---|---|
| 2,253,974 | A | * | 8/1941 | Guild | B65D 5/4204 206/388 |
| 2,851,028 | A | * | 9/1958 | Asbury | A01D 34/4166 125/5 |
| 3,246,729 | A | * | 4/1966 | Bishop | B41J 33/003 160/383 |
| 3,612,426 | A | * | 10/1971 | Germock, Jr. | H02G 11/02 242/399.2 |
| 3,985,170 | A | * | 10/1976 | Iskra | B25B 15/007 81/438 |
| 4,434,688 | A | * | 3/1984 | Bowles | B25B 15/007 81/451 |
| 4,610,555 | A | * | 9/1986 | Di Luco | B41J 33/003 242/607.2 |
| 5,340,030 | A | * | 8/1994 | Siegrist, Jr. | A01C 15/06 137/625.31 |
| 5,449,067 | A | * | 9/1995 | Cannon | H02G 11/02 174/135 |
| 5,871,091 | A | * | 2/1999 | Fogle | B65D 81/22 206/205 |
| 6,094,825 | A | * | 8/2000 | Hinson | A01D 34/4168 30/276 |

(Continued)

*Primary Examiner* — Jonathan Riley
(74) *Attorney, Agent, or Firm* — Schmeiser, Olsen & Watts, LLP (57) ABSTRACT

Disclosed herein is a string trimmer line holder device that includes a main body extending between a first end and a second end, the main body including a first opening proximate the first end and a second opening proximate the second end. A length of pre-cut string trimmer line is configured to be inserted into each of the first and second openings such that a first end of the pre-cut string trimmer line is inserted into the first opening and a second end of the pre-cut string trimmer line is inserted into the second opening.

20 Claims, 8 Drawing Sheets

(56) References Cited

U.S. PATENT DOCUMENTS

| | | | | |
|---|---|---|---|---|
| 2005/0258204 A1* | 11/2005 | Evans | ............... | A45F 5/02 |
| | | | | 224/197 |
| 2010/0320162 A1* | 12/2010 | Kao | ............... | B25H 3/04 |
| | | | | 211/70.6 |
| 2012/0085855 A1* | 4/2012 | Mitchell | ............ | A01D 34/4166 |
| | | | | 242/476.7 |
| 2015/0115110 A1* | 4/2015 | Makainai | ............... | F16G 11/00 |
| | | | | 248/68.1 |

\* cited by examiner

STRING TRIMMER LINE HOLDER DEVICE AND SYSTEM

RELATED MATTERS

This application claims priority to provisional patent application No. 61/992,439, filed May 13, 2014, and entitled "String Trimmer Line Holder Device," the disclosure of which is hereby incorporated by reference to the extent that it is not inconsistent with the present disclosure.

FIELD OF TECHNOLOGY

The subject matter disclosed herein relates generally to string trimmer accessories. More particularly, the subject matter relates to a device configured to hold line for string trimmers.

BACKGROUND

Different types of string trimmers utilize various different systems for replacing trimmer line. For example, some string trimmers require a user to wrap a large amount of line into a compartment within a head of the string trimmer. As line is used during trimming, an operator can typically retract the line from the head. This is usually done by pressing the head agains the ground while the head is rotating. While these types of string trimmers can last longer without requiring trimmer line replacement, the replacement process can be particularly difficult for an operator.

As such, other string trimmers have been developed whereby pre-cut lengths of trimmer line are insertable into the head of the trimmer. These string trimmers are much simpler to resupply with trimmer line. However, these pre-cut lengths of trimmer line need to be carried around by an operator on large jobs due to the fact that most jobs require multiple replacements of pre-cut lengths prior to completion. This often wastes time if an operator does not have extra pre-cut string trimmer line in their pocket. Even if they do have extra pre-cut line in their pocket, reaching for one or two pre-cut lengths will often dislodge others. As such, on industrial and commercial job sites, it is often the case that these pre-cut lengths of trimmer line are found, often unused, on the job site after completion of a grass cutting job. It is also common to find discarded lengths of used string trimmer line.

Thus, a string trimmer line holder device would be well received in the art.

BRIEF DESCRIPTION

According to one embodiment, a string trimmer line holder device comprises: a main body extending between a first end and a second end, the main body including a first opening proximate the first end and a second opening proximate the second end, wherein a length of pre-cut string trimmer line is configured to be inserted into each of the first and second openings such that a first end of the pre-cut string trimmer line is inserted into the first opening and a second end of the pre-cut string trimmer line is inserted into the second opening.

According to another embodiment, a string trimmer line holder device comprises: a main body extending between a first end and a second end, the main body configured to hold a plurality of lengths of pre-cut string trimmer line; and an attachment mechanism for attaching the string trimmer line holder device to a shaft of a string trimmer.

According to another embodiment, a string trimmer line holder system comprises: a string trimmer; a string trimmer line holder device including: a main body extending between a first end and a second end, the main body configured to hold a plurality of lengths of pre-cut string trimmer line such that each of the plurality of pre-cut string trimmer line is exposed outside the main body; and an attachment mechanism for attaching the string trimmer line holder device to a shaft of a string trimmer; and a receiver configured to receive a string line removal tool and attach the string line removal tool to the string trimmer line holder device, the string line removable tool configured to remove used string line from a head of the string trimmer; and a string line removal tool attached to the receiver.

DETAILED DESCRIPTION

A description of the hereinafter described embodiments of the disclosed apparatus and method are presented herein by way of exemplification and not limitation with reference to the photographs.

Figure 1:
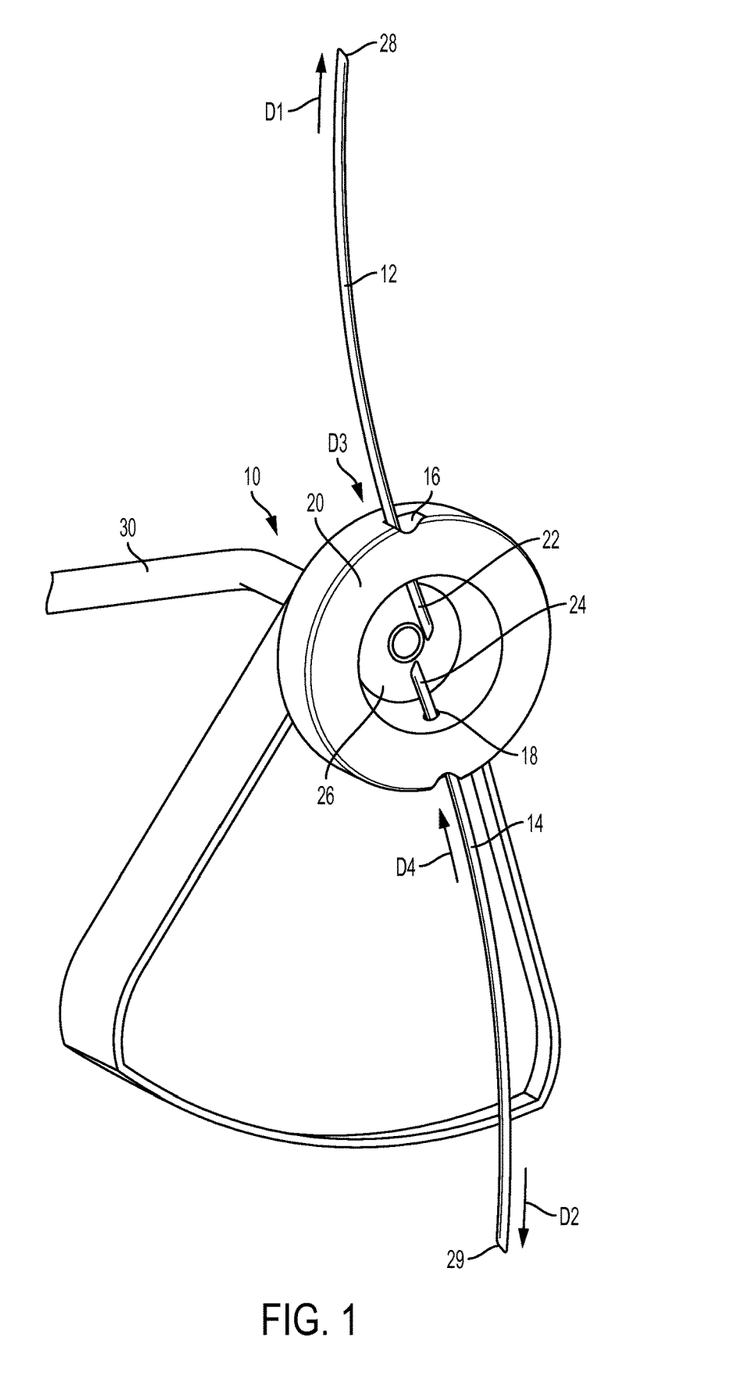
FIG. 1 depicts a string trimmer having a head configured to receive pre-cut line in accordance with one embodiment.

Referring to first FIG. 1, a string trimmer 10 is shown. The string trimmer 10 may be configured to receive pre-cut trimmer line, such as the pre-cut line 12, 14. This line 12, 14 may be insertable and retainable within openings 16, 18 of a head 20 configured to receive the line 12, 14 and retain the line 12, 14 within the head 20 during operation of the string trimmer 10. Within the head 20 through the opening 16, a mechanism may reside for preventing the line 12 from being pulled out of the head 20 when a force acts upon the line 12 in a direction D1. Similarly, a mechanism may reside in the head 20 through an opening 18 for preventing the line 14 from being pulled out of the head 20 when a force acts upon the line 14 in a direction D2. The openings 16, 18 may extend through the head 20. Ends 22, 24 of the line 12, 14, respectively, are configured to be inserted into the openings in directions D3 and D4, respectively, while ends 28, 29 are configured to cut. The mechanism within the head may be a spring loaded toothed device which may be configured to receive the pre-cut line 12, 14, and prevent the line from being removed from forces acting in directions D1 and D2 respectively, due to the direction in which the teeth face. Thus, within this compartment, the pre-cut lines 12, 14 are retainable with teeth such that the pre-cut lines 12, 14 cannot be removed via the application of radially outward force. This mechanism may prevent the lines 12, 14 from being pulled from the openings in a radially outward direction. Thus, in order to remove the lines 12, 14 from the openings 16, 18, the lines 12, 14 must be pulled radially inwardly. The lines may be accessed from a middle cavity 26 of the head 20. This prevents the line 12, 14 from being removed during operation of the string trimmer 10 when the head 20 rotates at high speeds. Further, a shaft 30 is shown extending from the head 20 which leads to a handle (not shown) and an engine or motor (not shown) for powering the head 20 to rotate about the shaft 30 to cut weeds, brush, grass or the like.

Referring now to FIGS. 2A, 3, 4, 5, and 6, a device 100 is shown. The device 100 includes a main body 110 extending between a first end 112 and a second end 114. In the embodiment shown, the main body 110 is shown to be cylindrical, although it should be understood that this shape is exemplary. Other shapes, such as cuboid are contemplated. Moreover, the length of the device 100 may be altered depending on the length of the pre-cut line designed to be contained by the device 100. The device 100 may further be made from plastic or rubber material, in one embodiment. Composite, wood, or metallic materials are also contemplated. The device 100 may include a first opening 116 located proximate the first end 112 and a second opening 118 proximate the second end 114. The openings 116, 118 may be configured to receive a first end 22 and a second end 28 of the precut line 12, shown to scale next to the device 100 in FIG. 2B.

Figure 3:
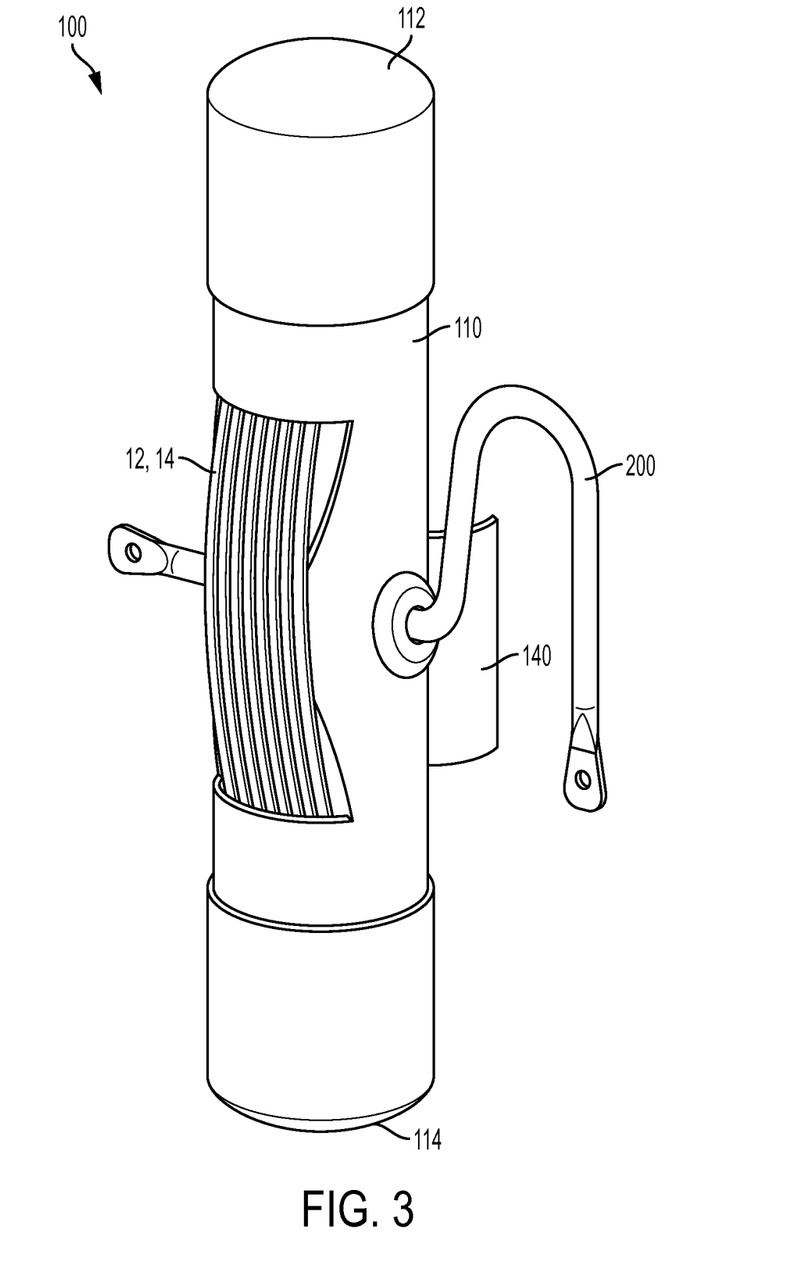
FIG. 3 depicts a front perspective view of the device of FIG. 2a holding a plurality of the pre-cut line of FIG. 2b and the line removal took of FIG. 2c in accordance with one embodiment.

The openings 116, 118 may be half ovular in shape. The half ovular shapes may each extend toward a middle portion 124 of the device 100. In other embodiments, other shaped openings are contemplated. For example, each of the openings 116, 118 may be a single slit having a width of two or more times the diameter of the pre-cut line 12, 14. In other embodiments, the openings 116, 118 may be wider openings having a constant thickness and extending partially around the circumference of the main body 110. Whatever the embodiment, the openings 116, 118 may be configured to retain the pre-cut line 12, 14 therein, as shown in FIG. 3, in a biased manner to provide easy access for an operator.

Figure 2A:
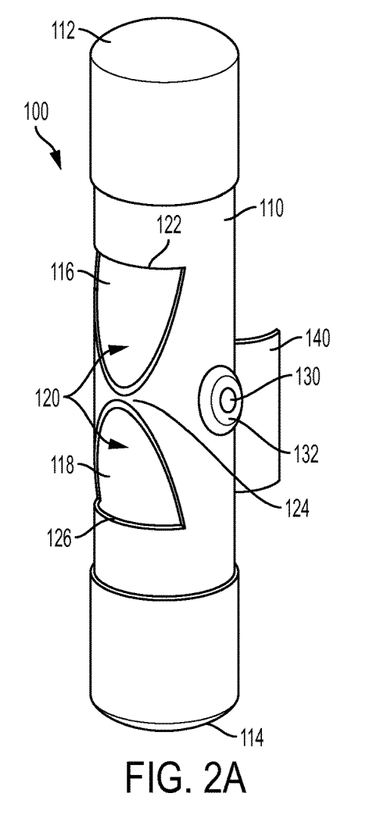
FIG. 2a depicts a front perspective view of a device configured to hold pre-cut line for the string trimmer of FIG. 1 in accordance with one embodiment.
Figure 2B:
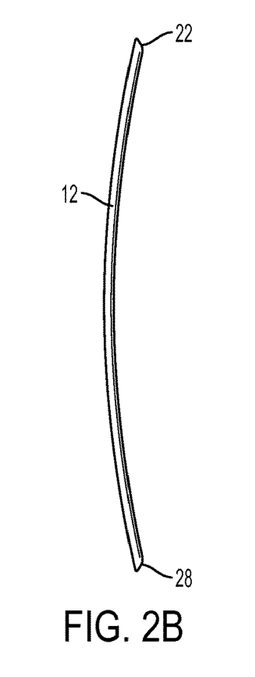
FIG. 2b depicts a perspective view of a pre-cut line for the string trimmer of FIG. 1 in accordance with one embodiment.

The openings 116, 118 may reveal at least one inner cavity 120. This inner cavity 120 may be configured to bias the semi rigid pre-cut lines 12, 14 into a semi-compressed state whereby the lines 12, 14 are slightly bent, as shown in FIG. 2B. Due to the elastic nature of the lines 12, 14, the bend in the lines 12, 14 caused by the placing of the lines 12, 14 in openings 116, 118, may cause the lines 12, 14 to be retained in the device 100. The lines 12, 14 may be biased into this flexed state with the ends 22, 24, 28, 29 of the line 12, 14 biased by a top edge 122 of the first opening 116, the middle portion 124 located between the first opening 116 and the second opening 118, and a bottom edge 126 of the second opening 118. This may permit a middle portion of the line 12, 14 to remain exposed to allow an operator of the string trimmer 10 to easily access one or more lines 12, 14 when necessary in order to replace used lines 12, 14 from the string trimmer 10. The openings 116, 118 may be formed in the device close to the top and bottom ends 112, 114 in order to provide a top end and bottom end to bias the lines 12, 14. Additionally, the ends of the lines 12, 14 may each be held in the biased state by the inside surface of the top and bottom ends 112, 114, depending if the length of the line 12, 14 is larger than the length of the device 100. Whatever the embodiment, the flexible string trimmer line 12, 14 may be held in a biased state within the openings 116, 118.

Figure 2C:
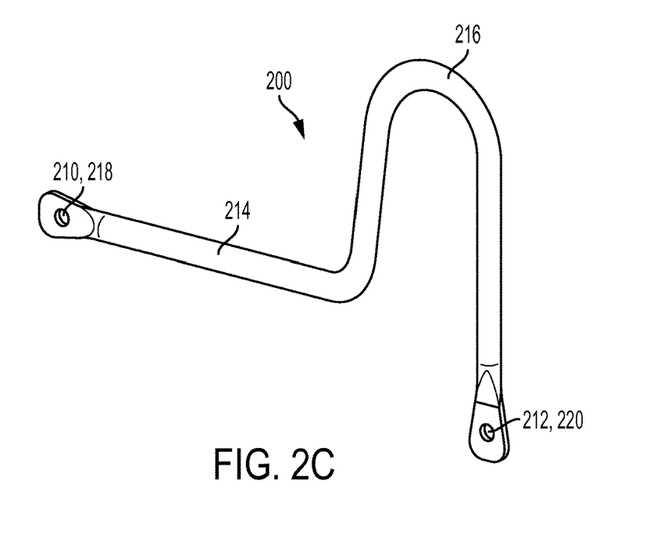
FIG. 2c depicts a perspective view of a line removal tool for a string trimmer in accordance with one embodiment.

The device 100 may further include a receiver 130 that is configured to receive a string line removal tool 200, as shown in FIG. 2C, and attach the string line removal tool 200 to the device 100. The receiver 130 may be two corresponding openings in the main body 110 of the device 100. The openings may be on opposite sides of the cylindrical main body 110 of the device 100 such that the string line removal tool 200 may extend through each of the openings and be retained. The receiver 130 may include a rubber outer ring 132. The outer ring 132 may include an opening having a diameter that is slightly smaller than the dimensions of the end of the string line removal tool 200 which may retain the string line removal tool 200 into the device 100 unless it is purposefully pulled out and removed by an operator.

Figure 7:
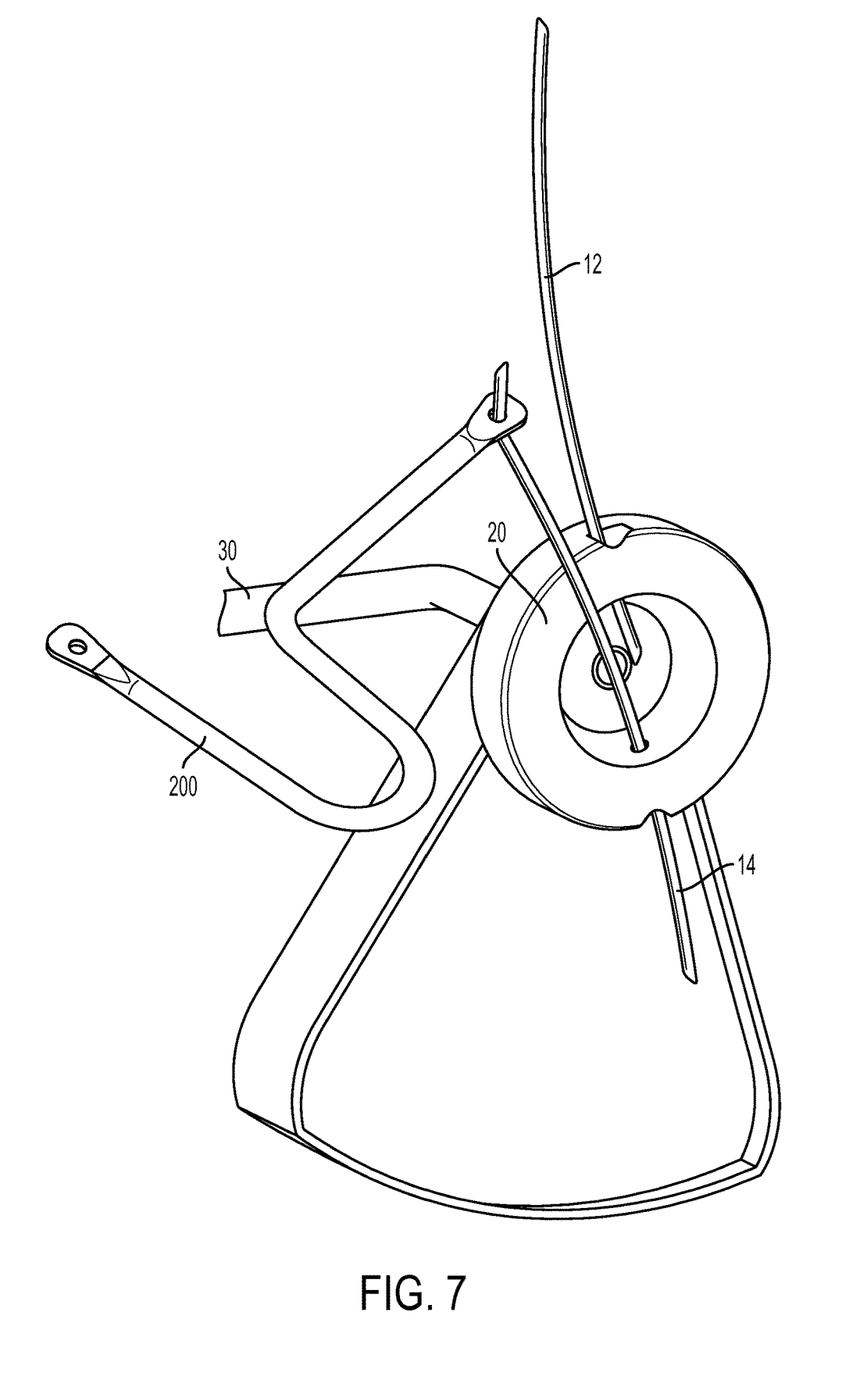
FIG. 7 depicts a perspective view of the line removal tool removing line from the head of the string trimmer of FIG. 1 in accordance with one embodiment.

The string line removal tool 200 is shown in FIG. 2C and may be configured to remove used string line from the head 20 of the string trimmer 10. The string line removal tool 200 may include a first end 210 and a second end 212. The first end 210 and the second end 212 may be flattened such that they have an increased width relative to the width at the main body of the tool 200 between the ends 210, 212. The ends 210, 212 may each include openings 218, 220. The openings 218, 220 may be configured to receive the pre-cut line 12, 14 there through, as shown in FIG. 7. The string line removal tool 200 may further include a straight portion 214 and a U-shaped portion 216. In one embodiment, the straight portion 214 may be inserted into the receiver 130 openings of the device 100. In one embodiment, the U-shaped portion 216 may be used to hold onto. When the straight portion 214 is rotated into a parallel position with the majority of the line 12 to be removed, as shown in FIG. 7, the perpendicular bend placed on the end of the line 12 located in the opening 210 of the tool retains the line 12 in the tool, allowing a user to easily pull out the line 12 from the head 20. Both the first end 210 an the second end 212 may include the respective openings 218, 220 such that either end may be utilized by an operator, whichever is more ergonomic or more comfortable to pull from, depending on, for example, hand size of the operator.

As shown in FIG. 3, the straight portion 214 is configured to extend through the receiver 130 and into the cavity 120 of the device 100 when the device 100 is holding the tool 200. Moreover, FIG. 3 shows that the device 100 may be configured to hold between 20-30 pre-cut lines 12, 14. This may enable the operator of a string trimmer to not have to refill the device 100 often.

Figure 4:
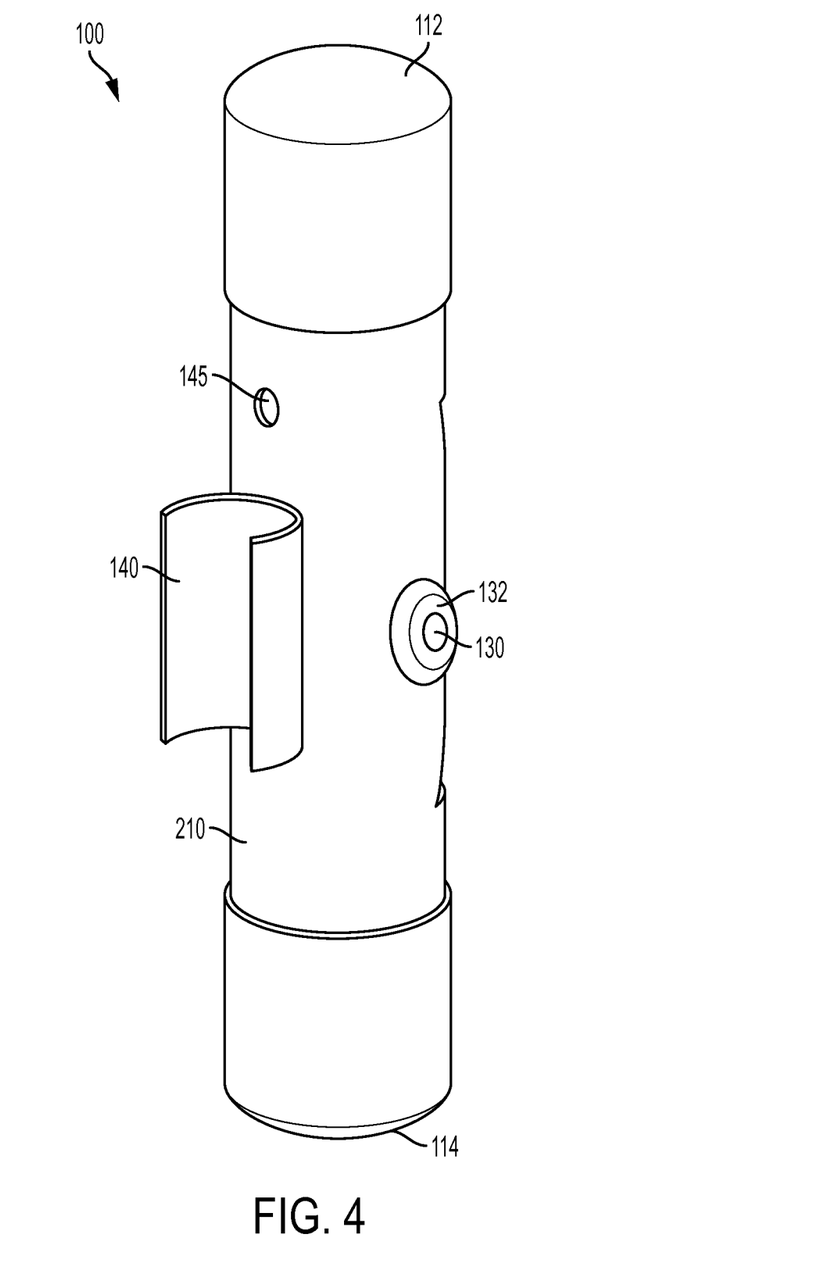
FIG. 4 depicts a back perspective view of the device of FIGS. 2a and 3 having an attachment mechanism for attaching the device to a rod such as the rod of the string trimmer of FIG. 1 in accordance with one embodiment.
Figure 5:
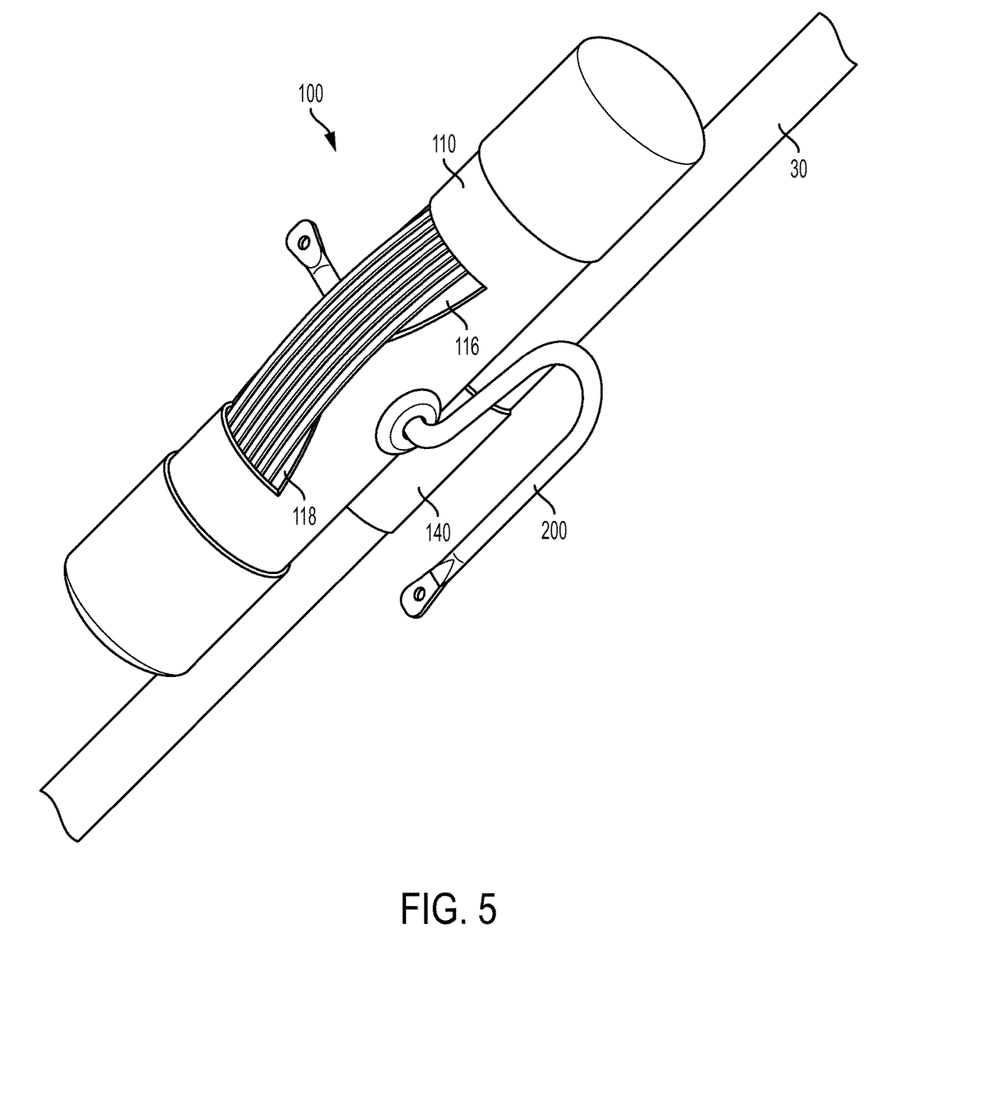
FIG. 5 depicts a perspective view the device of FIGS. 2a, 3 and 4 attached to the string trimmer of FIG. 1 in accordance with one embodiment.

Further, referring to FIGS. 4-5, the device 100 is shown having an attachment mechanism 140 which may be configured to attach the device 100 to the shaft 30 of the string trimmer 10, as shown in FIG. 5. The attachment mechanism 140 may be configured to retain the device 100 on the shaft 30 such that the device does not rotate about the shaft 30 during operation of the string trimmer 10. In the embodiment shown, the attachment mechanism 140 may be a flexible clamp extending in a semi annular manner greater than 180 degrees. The attachment mechanism 140 may deflect briefly when being attached onto the shaft 30. The diameter of the semi annular attachment mechanism 140 may be the same or smaller, for example, than the diameter of the shaft 30. It should be understood that other clamping or attachment mechanisms are contemplated for attaching the device 100 to the shaft 30 of the string trimmer 10. Furthermore, in other embodiments, clamps (not shown) may be configured to attach the device 100 to the belt of a wearer. Whatever the embodiment, the device 100 may include a mechanism for attachment to a location that may be easily accessible during operation of the string trimmer 10. Further, the main body 110 of the device 100 may extend along the same axis as the shaft 30 of the string trimmer 10 when the string trimmer line holder device 100 is attached to the shaft 30 of the string trimmer 10.

Figure 6:
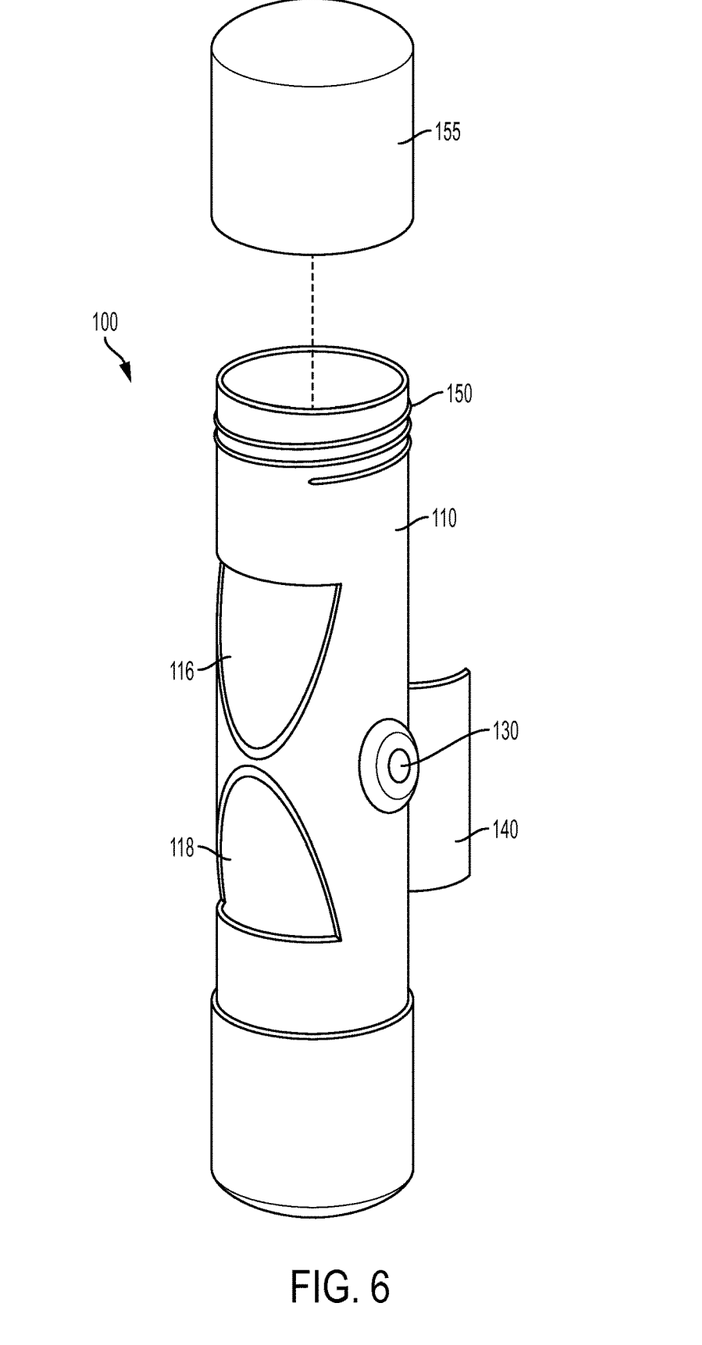
FIG. 6 depicts a perspective view of the device of FIGS. 2a, 3, 4 and 5 having a removable cap in accordance with one embodiment.

In another embodiment, as shown in FIG. 4, the device 20 may include an opening 145 which may be configured to receive fragments of used line. These fragments may be worn down from use to a length that is much shorter than the full length of the pre-cut lines 12, 14. This opening may utilize gravity to retain the used fragments in the cavity 120 of the device 100 throughout the course of the day, until the device 100 may be emptied at the end of a day or at the end of a job. The device 100 may thus provide a convenient location for these fragments to be retained to prevent operators from disposing of them on the job site that is being maintained. As shown in FIG. 6, the device 100 may include a removable cap 155 configured to be screwed onto the top end 112 which may be threaded with threads 150. This removable cap 155 may be configured to allow for easy access to the cavity 120 of the device 100 for removal of the fragments of used line. In other embodiments, the removable cap may be press fit onto the top end 112 of the device 100.

Figure 8:
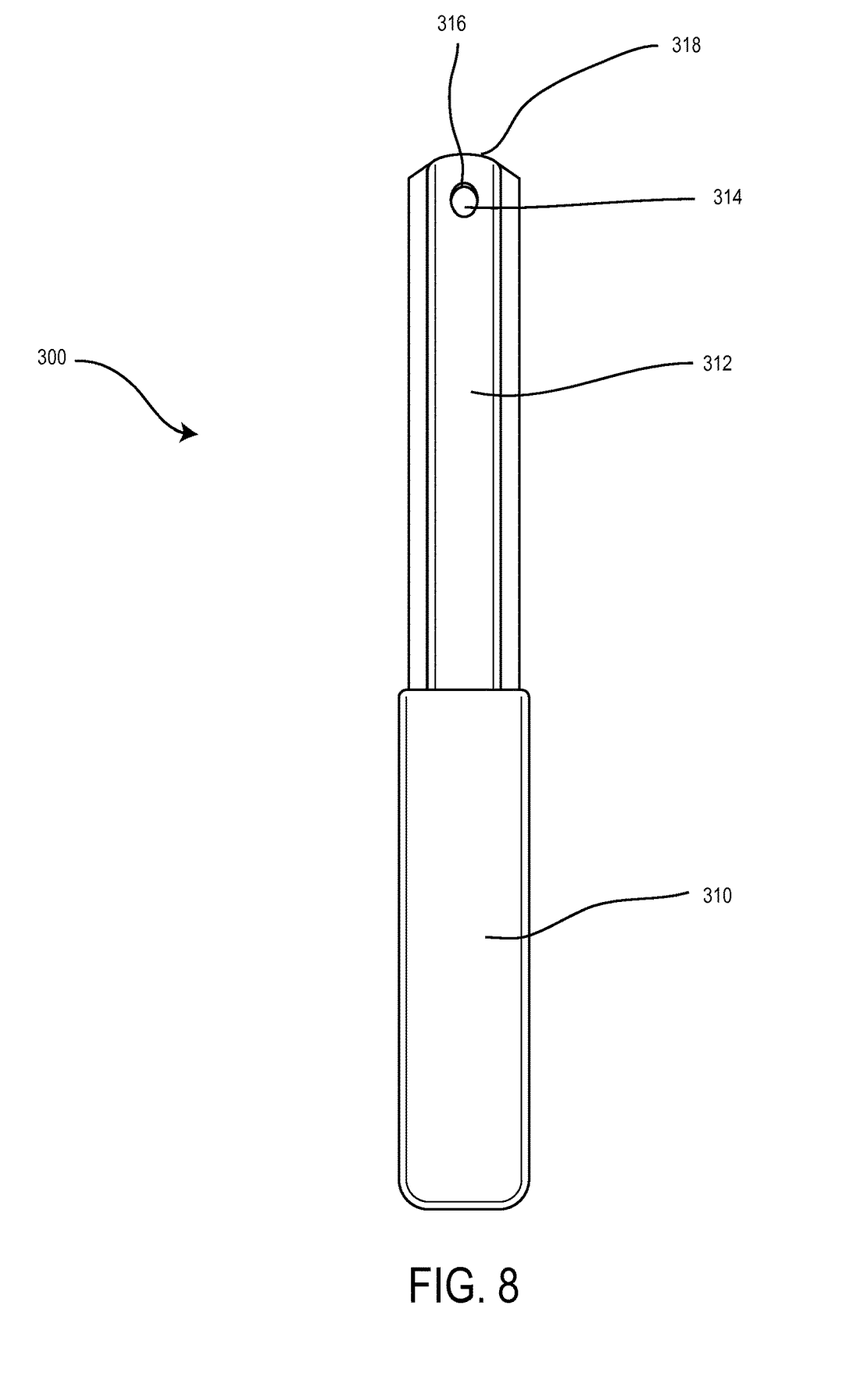
FIG. 8 depicts another line removal tool in accordance with one embodiment.

Referring now to FIG. 8, another string line removal tool 300 is shown. The tool 300 may include a handle portion 312 and an elongated portion 310 which includes an opening 314. The opening 314 may include a sharp edge 316. The opening 314 may be configured to receive the line 12, 14 of the string trimmer in a similar manner as the tool 200. Once received, the tool 200 may then grip the line 12, 14 to allow the line to be easily pulled out, once it is used. The sharp edge 316 of the opening 314 may be configured to grip the line 12, 14 and prevent the line from slipping through the opening 314. Still further, the tool 300 may include a narrow end 318. The narrow end 318 may be configured to poke the used line fragments through the openings of the head 20 of the string trimmer 10.

Other embodiments of devices configured to hold pre-cut line are contemplated. For example, in one embodiment (not shown), a device includes a cylindrical cavity having a removable cap and an attachment mechanism for attaching the device to a shaft of a string trimmer. Unlike the device 100, other devices may not include the openings 116, 118 to bias the pre-cut line in an accessible position. The device may simply house the pre-cut line within the inner cavity. Thus, a user may have to unscrew or remove the removable cap to get to the pre-cut line.

Elements of the embodiments have been introduced with either the articles "a" or "an." The articles are intended to mean that there are one or more of the elements. The terms "including" and "having" and their derivatives are intended to be inclusive such that there may be additional elements other than the elements listed. The conjunction "or" when used with a list of at least two terms is intended to mean any term or combination of terms. The terms "first" and "second" are used to distinguish elements and are not used to denote a particular order.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

I claim:

1. A string trimmer line holder device comprising:
a main body extending between a first end and a second end, the main body including a first opening proximate the first end and a second opening proximate the second end, wherein the main body includes a middle portion located between the first opening and the second opening, wherein the first opening is half ovular in shape and includes a first flat edge parallel to the first end and a first curved edge extending from the first flat edge toward the middle portion such that the first flat edge extends continuously from a first end of the first curved edge to a second end of the first curved edge, and wherein the second opening is half ovular in shape and includes a second flat edge parallel to the second end and a second curved edge extending from the second flat edge toward the middle portion such that the second flat edge extends continuously from a first end of the second curved edge to a second end of the second curved edge, wherein the first and second openings are configured to receive a plurality of lengths of pre-cut string trimmer line such that a first end of each of the plurality of lengths of the pre-cut string trimmer line is insertable into the first opening and a second end of each of the plurality of lengths of the pre-cut string trimmer line is inserted into the second opening; and
an attachment mechanism for attaching the string trimmer line holder device to a shaft of a string trimmer.

2. The string trimmer line holder device of claim 1, wherein the attachment mechanism is located on the main body opposite the first and second openings.

3. The string trimmer line holder device of claim 2, further comprising a receiver configured to receive the string line removal tool and attach the string line removal tool to the string trimmer line holder device.

4. The string trimmer line holder device of claim 1, wherein the main body is cylindrical in shape.

5. The string trimmer line holder device of claim 1, wherein the middle portion is configured to bias a middle of the pre-cut string trimmer line outside the main body when the first end of the string trimmer line is inserted into the first opening and the second end of the string trimmer line is inserted into the second opening.

6. The string trimmer line holder device of claim 1, wherein the main body includes an opening configured to receive used string trimmer line into a cavity of the main body.

7. The string trimmer line holder device of claim 6, further comprising a removable cap located at one of the first end and the second end, the removable cap providing access to the cavity of the main body for emptying the cavity.

8. The string trimmer line holder device of claim 1, wherein the first opening and the second opening are configured to receive at least ten pre-cut string trimmer lines at a time.

9. The string trimmer line holder device of claim 1, wherein the attachment mechanism includes a shape having a semi annular cross section extending along a first axis and configured to receive the shaft of the sting trimmer, and wherein the main body extends along a second axis, wherein the second axis is parallel to the first axis.

10. The string trimmer line holder device of claim 1, wherein the main body is a hollow cylinder that surrounds an inner cavity, and wherein the first and second openings are longitudinally aligned.

11. A string trimmer line holder device comprising:
a main body extending between a first end and a second end, the main body including a first opening and a second opening, the main body configured to hold a plurality of lengths of pre-cut string trimmer line;
an attachment mechanism for attaching the string trimmer line holder device to a shaft of a string trimmer;
wherein the main body includes a middle portion located between the first opening and the second opening, wherein the first opening is half ovular in shape and includes a first flat edge parallel to the first end and a first curved edge extending from the first flat edge toward the middle portion such that the first flat edge extends continuously from a first end of the first curved edge to a second end of the first curved edge, and wherein the second opening is half ovular in shape and includes a second flat edge and a second curved edge extending from the second flat edge toward the middle portion such that the second flat edge extends continuously from a first end of the second curved edge to a second end of the second curved edge, and wherein the middle portion is configured to bias a middle of each of the plurality of the pre-cut string trimmer line outside the main body when the first end of each of the plurality of the string trimmer line is inserted into the first opening and the second end of each of the plurality of the string trimmer line is inserted into the second opening.

12. The string trimmer line holder device of claim 11, wherein the attachment mechanism is located on the main body opposite the first and second openings.

13. The string trimmer line holder device of claim 11, wherein the main body is cylindrical in shape.

14. The string trimmer line holder device of claim 12, further comprising a receiver configured to receive the string line removal tool and attach the string line removal tool to the string trimmer line holder device, the string line removable tool configured to remove used string line from a head of the string trimmer.

15. The string trimmer line holder device of claim 11, wherein the main body includes an opening configured to receive used string trimmer line into a cavity of the main body.

16. The string trimmer line holder device of claim 15, further comprising a removable cap located at one of the first end and the second end, the removable cap providing access to the cavity of the main body for emptying the cavity.

17. The string trimmer line holder device of claim 11, wherein the attachment mechanism includes a shape having a semi annular cross section extending along a first axis, and wherein the main body extends along a second axis, wherein the second axis is parallel to the first axis.

18. The string trimmer line holder device of claim 11, wherein the main body is a hollow cylinder that surrounds an inner cavity, and wherein the first and second openings are longitudinally aligned.

19. A string trimmer line holder system comprising:
a string line removal tool having a flattened end, the flattened end including an opening configured to receive pre-cut string trimmer line; and
a string trimmer line holder device including:
a main body extending between a first end and a second end, the main body having two half ovular openings configured to hold a plurality of lengths of pre-cut string trimmer line such that at least a portion of each of the plurality of pre-cut string trimmer line is exposed outside the main body; wherein the main body is a hollow cylinder that surrounds an inner cavity, and wherein the two half ovular openings are longitudinally aligned, wherein the main body includes a middle portion located between the two half ovular openings, and wherein the two half ovular openings each include a flat edge and a curved edge extending from the flat edge toward the middle portion; and
an attachment mechanism for attaching the string trimmer line holder device to a shaft of a string trimmer; and
a receiver configured to receive the string line removal tool and attach the string line removal tool to the string trimmer line holder device, the string line removable tool configured to remove used string line from a head of the string trimmer; and
a string line removal tool attached to the receiver.

20. The string trimmer line holder device of claim 11, wherein the main body is configured to hold at least eight lengths of pre-cut string trimmer line.

* * * * *